(12) United States Patent
Kaligian, II et al.

(10) Patent No.: US 6,273,345 B1
(45) Date of Patent: Aug. 14, 2001

(54) HIGH PERFORMANCE SLURRY SPRAY MACHINE

(75) Inventors: Raymond A. Kaligian, II, Geneva, IL (US); James E. Messer, Westlake, OH (US); Salvatore C. Immordino, Trevor, WI (US); Michael J. Porter, Hanover Park; William G. Rector, McHenry, both of IL (US); Timothy Ross, Kannapolis, NC (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/505,455

(22) Filed: Feb. 11, 2000

(51) Int. Cl.$^7$ ....................................................... B05B 7/06
(52) U.S. Cl. ...................... 239/419.3; 239/427; 239/428; 239/433; 239/424; 239/407
(58) Field of Search ..................................... 239/418, 422, 239/427, 428, 433, 419, 419.3, 424, 417.5, 423.3, 427.5, 423, 407, 290, 296

(56) References Cited

U.S. PATENT DOCUMENTS

| | | | |
|---|---|---|---|
| 3,049,439 | * | 8/1962 | Coffman . |
| 3,073,534 | * | 1/1963 | Hampshire . |
| 3,565,345 | * | 2/1971 | Moltzan . |
| 4,193,773 | * | 3/1980 | Staudinger . |
| 4,411,388 | * | 10/1983 | Muck . |
| 4,421,797 | * | 12/1983 | Kochne . |
| 4,891,249 | * | 1/1990 | McIntyre . |
| 5,143,296 | * | 9/1992 | Saurwein et al. . |
| 5,419,491 | * | 5/1995 | Breitsprecher . |

* cited by examiner

*Primary Examiner*—David A. Scherbel
*Assistant Examiner*—Christopher S. Kim
(74) *Attorney, Agent, or Firm*—Greer, Burns & Crain, Ltd.; John M. Lorenzen; David F. Janci

(57) ABSTRACT

A slurry spray machine for spraying a settable slurry includes a main passageway configured for receiving a supply of pressurized slurry and having a supply end and an outlet end opposite the supply end. A first compressed gas inlet is disposed intermediate the supply and outlet ends and in fluid communication with the passageway for introducing a first supply of pressurized gas into the slurry, and a second pressurized gas inlet is disposed closer to the outlet end than the first inlet and in fluid communication with the passageway for introducing a second supply of pressurized gas into the slurry. A pressurized supply of adjuvant is provided in fluid communication with the second pressurized gas inlet for providing a blended gas to the second gas inlet. At least one valve is provided for controlling the flow of slurry through the passageway and the flow of the first and second gases into the passageway. Prior to the pressurized ejection of the slurry from the outlet end, the first gas is injected into the slurry, and the blended gas is mixed with the slurry and the first pressurized gas between the first gas inlet and the outlet end.

21 Claims, 4 Drawing Sheets

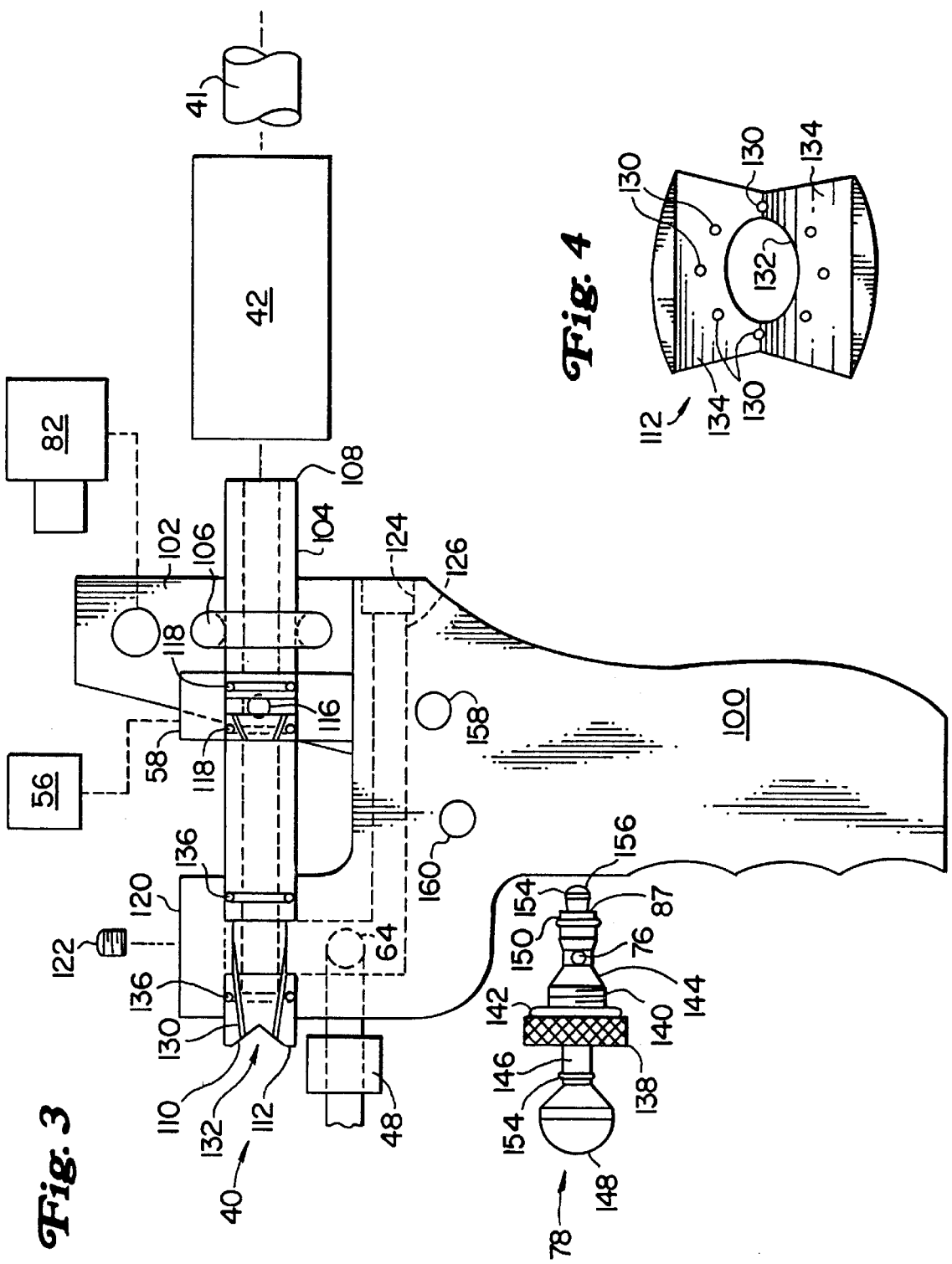

HIGH PERFORMANCE SLURRY SPRAY MACHINE

BACKGROUND OF THE INVENTION

The present invention relates to machines for spraying slurries of settable substances such as plaster or gypsum cement, and more specifically, to an improved spray machine suitable for spraying the slurry upon a vertical surface so that the slurry sets quickly.

In industrial, architectural and tooling applications, such as the fabrication of molds for the construction of large fiberglass or plastic items such as boat hulls, it has been contemplated to create a master form out of a sprayable plaster, also known as calcium sulfate hemihydrate composition. Unlike prior sprayable plaster slurries, the present slurry composition may have relatively high viscosity and/or high cohesiveness, and is preferably formulated to be readily machinable so that once sprayed and set upon the substrate, the form can be shaped using conventional machining tools.

However, in developing a suitable spray apparatus for achieving this goal, it has been found that conventional systems for spraying plaster are unsuitable for this application. Conventional plaster slurry spray machines utilize spray gun designs such as pole guns which are unwieldy and lack the necessary precision, are designed for spraying paint or resin and are typically internal mix designs.

More specifically, conventional spray machines employ simple peristaltic or progressive cavity pumps fed by a drum or other type of slurry storage/mixing container. The slurry is pumped and delivered to an atomizing device ("spray gun") which range from an internally atomized to an externally atomized device which breaks up the slurry with compressed air. It is known in such devices to incorporate so-called chopper guns, which are fed a supply of rope-like fiberglass roving, and chop the roving into fibers which are then incorporated into the slurry to add strength.

It is also known in such devices to inject a stream of accelerant (also referred to herein as "accelerator") into the slurry to reduce the set time once the slurry is sprayed on the substrate. If the accelerant is injected internally (within the gun), it has been found that the slurry begins to prematurely set inside the gun, causing clogging and interfering with cleaning of the spray apparatus. Such systems require frequent maintenance to remove any buildup of set particles. Externally supplied accelerants have been found to supply a non-uniform distribution of accelerant to the slurry stream, causing spotty plaster set times. In such cases, the resulting product has an uneven appearance and cannot be worked as rapidly as desired.

A design criterion of such systems is that peristaltic pumps are typically used. However, a drawback of such a system is that the slurry is delivered in a pulsating flow which is not uniform. This causes difficulties for both the operator and the uniform integration of accelerant or chopped fiberglass into the plaster slurry stream. Progressive cavity pumps deliver slurry at a constant rate, but are expensive and difficult to clean and maintain.

Further, conventional slurry spray systems are equipped with ball valves, which are prone to plaster build-up and premature failure. Lastly, conventional slurry spray systems do not provide the user with the ability to finely control slurry output.

Accordingly, there is a need for a spray apparatus configured for spraying a settable slurry such as a plaster slurry, which is relatively low maintenance, hinders clogging caused by premature setting of the slurry, yet provides for the incorporation of an accelerant into the slurry, which provides for a relatively uniform or constant output of slurry and which provides for a relatively finite output adjustability controlled by the user.

Thus, it is a first object of the present invention to provide an improved slurry spray apparatus which incorporates an accelerant into the slurry without internal clogging, and so that the accelerant is generally uniformly distributed in the slurry.

Another object of the present invention is to provide an improved slurry spray apparatus which emits or ejects the slurry at a relatively constant rate to achieve a more uniform sprayed substrate.

A further object of the present invention is to provide an improved slurry spray apparatus in which the component parts such as pumps and valves are designed to accommodate the unique characteristics of plaster slurries for efficient industrial applications.

A still further object of the present invention is to provide an improved slurry spray apparatus which features a pneumatically operated control and valve system for operator safety and for more controllable output of the sprayed slurry.

BRIEF SUMMARY OF THE INVENTION

The above-listed objects are met or exceeded by the present high performance slurry spray machine, which features an applicator or spray gun having two points of atomization by compressed air. The first atomization point introduces compressed air into the slurry to increase its spray ability. A second atomization point is preferably located at the slurry spray outlet of the spray gun, and achieves two goals. First, the slurry is still further atomized, for a more even application. Second, the accelerant is vaporized and blended with compressed air at the second atomization point to prevent in-gun clogging while providing a more uniform distribution of accelerant in the sprayed slurry. Specially designed manifolds and outlet nozzles are provided for atomizing the slurry and for mixing the vaporized and atomized accelerant with the main slurry flow. An open-topped slurry container coupled to a positive displacement pump provide constant feed flow of this type of slurry.

Another feature of the present spray apparatus is the inclusion of a dampening device in applications where a pulsating-type pump is employed. The dampener evens out the flow pulses, and is designed to be used with the somewhat abrasive and sometimes relatively viscous plaster slurries. Pneumatically controlled pinch valves are used throughout the apparatus to prevent the clogging through plaster buildup inherent with conventional ball valves.

More specifically, the present invention provides a slurry spray machine for spraying a settable slurry includes a main passageway configured for receiving a supply of pressurized slurry and having a supply end and an outlet end opposite the supply end. A first compressed gas inlet is disposed intermediate the supply and outlet ends and in fluid communication with the passageway for introducing a first supply of pressurized gas into the slurry, and a second pressurized gas inlet is disposed closer to the outlet end than the first inlet and in fluid communication with the passageway for introducing a second supply of pressurized gas into the slurry. A pressurized supply of adjuvant is provided in fluid communication with the second pressurized gas inlet for providing a blended gas to the second gas inlet.

At least one valve is provided for controlling the flow of slurry through the passageway and the flow of the first and second gases into the passageway. Prior to the pressurized ejection of the slurry from the outlet end, the first gas is injected into the slurry, and the blended gas is subsequently mixed with the combined slurry and the first pressurized gas.

BRIEF DESCRIPTION OF THE SEVERAL VIEWS OF THE DRAWINGS

FIG. 3 is a diagrammatic side elevational view of the applicator or spray gun used in the system of FIGS. 1 and 2;

FIG. 4 is an end view of the nozzle used with the applicator of FIG. 3;

DETAILED DESCRIPTION OF THE INVENTION

Figure 1:
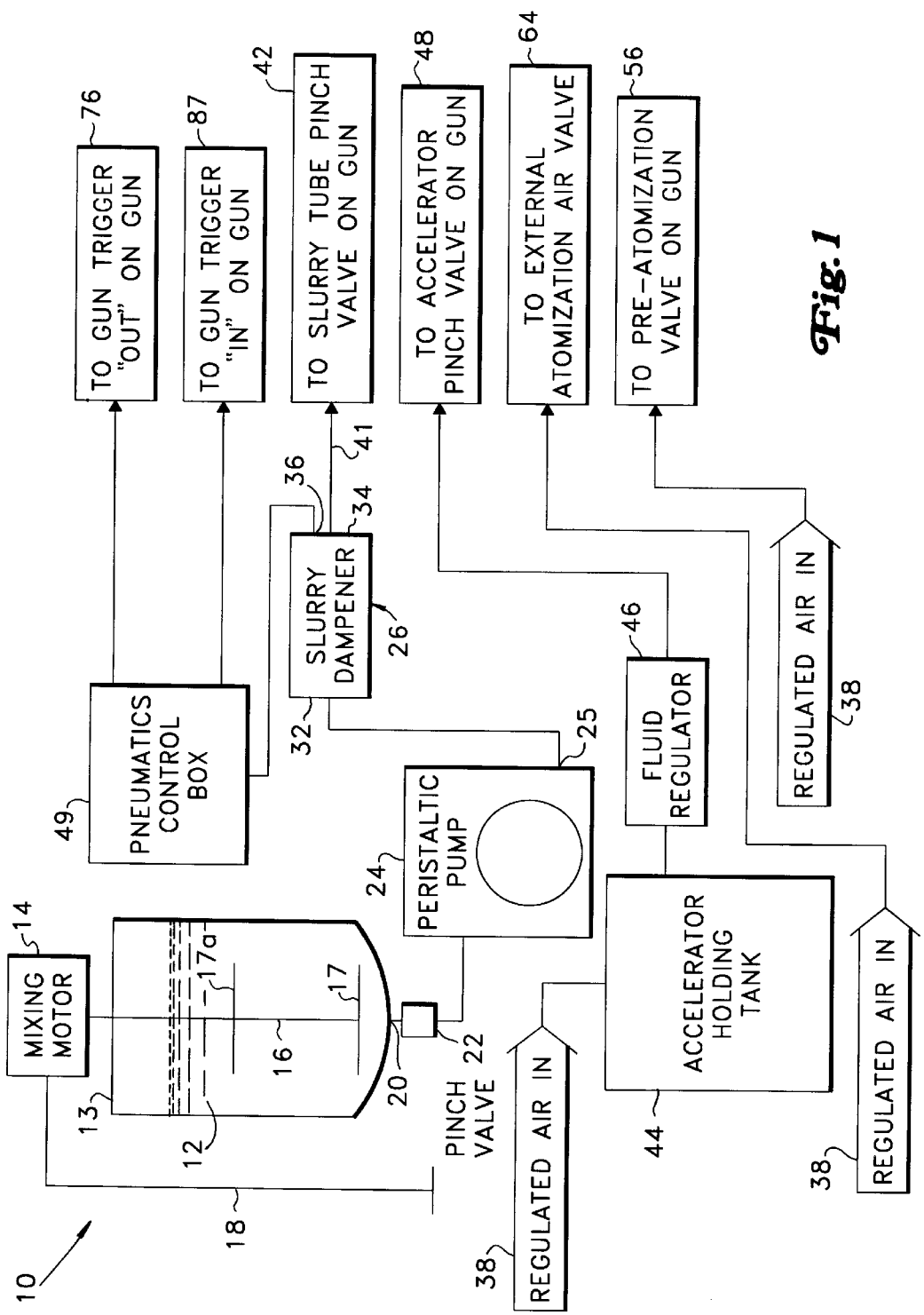
FIG. 1 is a partial schematic of the present high performance slurry spray system.

Referring now to FIG. 1, the present high performance slurry spray system is generally designated 10 and is designed for spraying settable slurries, such as plaster or gypsum cement slurries in industrial applications. The present apparatus is particularly suitable for applying a thin coating of slurry upon a generally vertical substrate, and achieving a relatively uniform appearing and setting layer. The system 10 includes a slurry mixing and storage tank 12 suitably dimensioned for retaining a supply of slurry. In the present system, it is preferred that alpha or beta calcium sulfate hemihydrate or plaster slurry is used, however other compositions are contemplated, for example slurries containing a mixture of alpha and/or beta calcium sulfate hemihydrate and other non calcium sulfate hemihydrate slurries such as portland cement blends (sometimes referred to as a gypsum cement), or magnesium phosphate cement formulations, depending on the application. It is also preferred that the mixing and storage tank 12 be made of a lightweight, water and corrosion resistant, sturdy material such as rigid plastic. However, other equivalent materials are contemplated, including stainless steel, fiberglass and aluminum. It is also preferred that the tank 12 have an open top 13 to facilitate pouring of ingredients and for exposure to atmospheric pressure, and a conical or tapered bottom to facilitate complete drainage. It has been found that an open-topped tank facilitates uniform slurry flow rates, especially when coupled to a positive displacement pump, as described below.

A mixing motor 14 with an impeller 16 is provided and mounted relative to the tank 12 so that the impeller can engage the slurry in the tank. In the preferred embodiment, the impeller has two sets of blades, 17 and 17a. The first set 17 is located at a tip of the impeller, and the second set 17a is located approximately midway up the length of the impeller, and preferably about 4 to 5 inches below the level of liquid in the tank 12. It is preferred that the mixing motor 14 be at least of 5 HP capacity, and that the motor and the impeller 16 are mounted to a powered lift 18 for easy loading of the slurry ingredients, and easy cleaning of the tank 12. The lift 18 is configured so that the mixing motor 14 and the impeller 16 may be vertically withdrawn from, or inserted into, the tank 12.

Plaster or gypsum cement slurry is mixed in a plastic tank by means of either an automated weighing process (i.e. load cells), or by a manual batching process, as is known in the art. Also, using known technology, automated mixing/cleaning cycles are also controlled via electromechanical methods.

An outlet 20 of the tank 12 is in fluid communication with a valve 22, which in the preferred embodiment is a pneumatically operated pinch valve. While other types of slurry control valves are also contemplated for use with the present system 10, pinch valves are preferred because they do not become clogged with set plaster. Instead, upon entering the valve, the slurry flows through a rubber tube which is surrounded by a pressurized canister. By selective application of pressure, in the preferred embodiment pneumatic pressure, the flow of slurry through the hose can be controlled. Such valves are known in the art, and because of their superior qualities for the present application, have been incorporated into all valving locations of the present system 10 which are potentially exposed to the slurry.

Downstream of the valve 22 is a pump 24, which is in fluid communication with the valve 22 and the tank 12. While a variety of pumps are contemplated for use with the present system, including, but not limited to gear pumps, piston pumps, diaphragm pumps, and progressive cavity pumps, the preferred type of pump in the system 10 is a positive displacement pump, specifically a peristaltic pump, and particularly a high-pressure type using a lubricating bath of glycerin to the internal stator hose. A variable speed DC motor (not shown) supplies power to the pump. Although it emits a pulsating output flow, the moving parts of the peristaltic pump do not become exposed to the settable slurry. A suitable commercial example of a preferred type of pump is the DL Series of pumps manufactured by PCM POMPES, 17 rue Ernest Laval —BP 35, 972173 Vanves Cedex, France. The preferred pump 24 has a minimum flow rate of 84 tons/hr, a maximum flow rate of 20 m3/hr and a speed of between 5 to 133 rpm. In the preferred embodiment, an outlet 25 of the pump is configured as a quick connect fitting which is easily disconnected and allows the connection of a garden hose into the system for flushing purposes. Another suitable pump is a progressive cavity positive displacement pump manufactured by Moyno Products, Fluids Handling Division, Robbins & Meyers, Inc., Springfield Ohio. It has been found that the combination of the tank 12 with the open top 13, and the positive displacement pump 24 provided with a dampener as described below has resulted in a generally uniform flow rate of plaster slurry.

The purpose of the pump 24 is to pressurize the slurry in the system, and as acknowledged above, a drawback of peristaltic pumps is the pulsating output flow. If left untreated, this type of flow would result in an uneven flow of slurry upon the substrate, which would be undesirable in the type of targeted industrial application, i.e., the fabrication of large forms for fiberglass or other types of plastic molding. Accordingly, one feature of the present system is to provide a mechanism for dampening the pulses generated by the pump 24 in a way which will be suitable for use with the present type of settable slurry.

Figure 5:
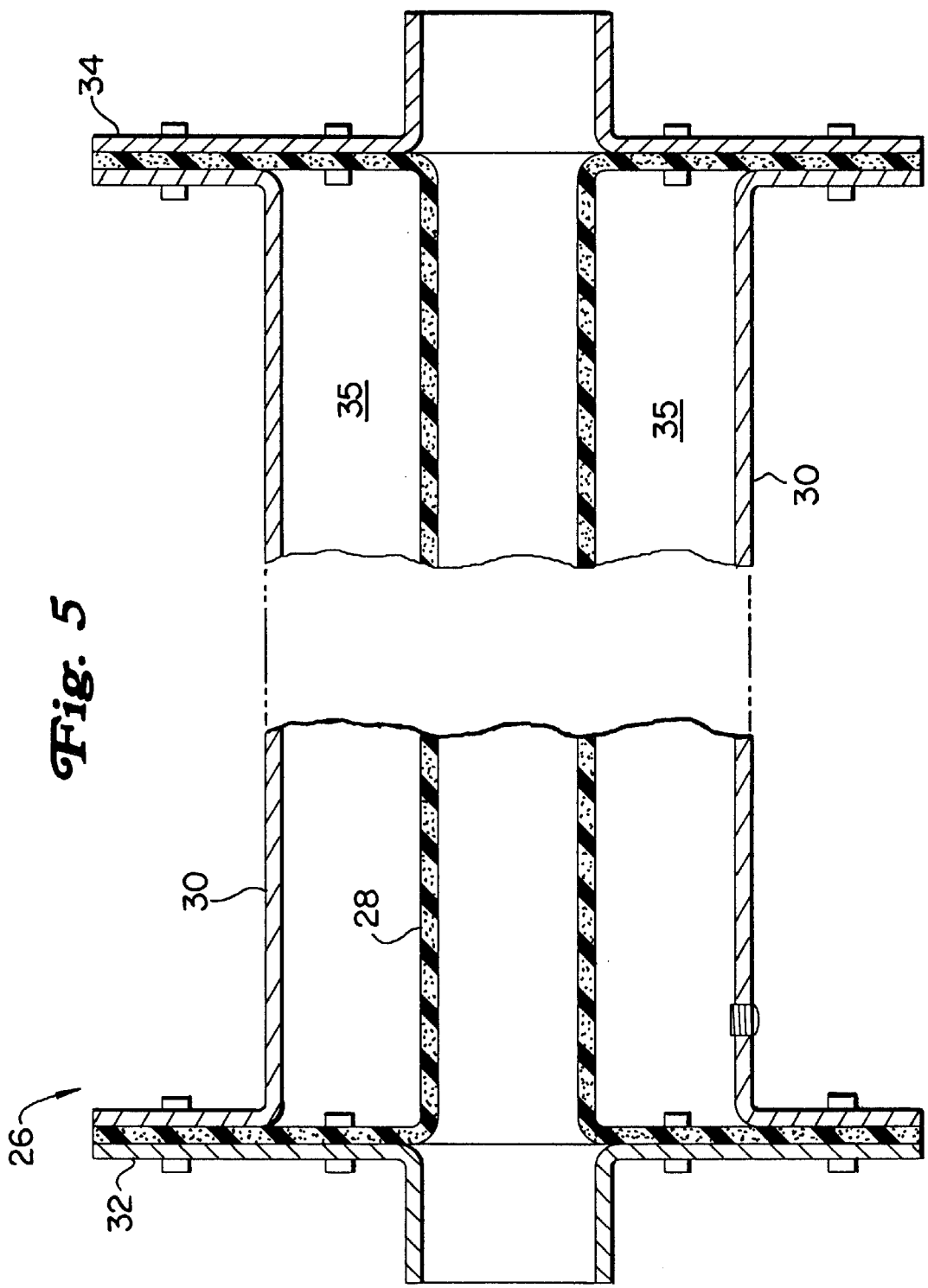
FIG. 5 is a vertical sectional view of the dampener depicted schematically in FIG. 1.

Referring now to FIGS. 1 and 5, an accumulator, surge suppressor or dampening device 26 which is suitable for use with the present system 10 operates under a similar principle as a pinch valve, and includes an inner flexible or rubber-like bladder or tube 28 which is in fluid communication with the pump 24, the valve 22 and the tank 12. A rigid, elongate cylindrical jacket 30 surrounds the tube 28, and is provided with flanged ends 32, 34 which are also sealingly coupled to ends of the tube. It is contemplated that the ends of the tube 28 may be sealingly secured to the flanged ends 32, 34 by chemical adhesive, threaded fasteners and clamps, combinations of the above, or other known fastening technologies. In this manner, a chamber 35 is created about the tube 28. This sealed coupling allows for the introduction of pressurized gas (preferably air) through a pressurized air inlet 36 into the sealed chamber 35. Sufficient pressurized air is introduced from a compressor 38 into the cylindrical jacket 30 to regulate the flow pulses generated by the pump 24. The compressor 38 is preferably capable of providing 100 psi of air @ 30 CFM.

It is contemplated that the volume of pressurized air retained by the jacket 30 may vary with the application. It is also contemplated that other types of apparatus may be provided which employ pneumatic pressure to equivalently dampen the pulses of pressure in the pump output line, as does the dampener 26. It is further contemplated that the cylindrical jacket 30 will be of sufficient length to enable the pneumatic pressure to sufficiently dampen the pressure surges produced by the pump 24. A spray applicator or spray gun 40 (best seen in FIG. 3) is placed in fluid communication with the flow of slurry emitted from the dampener 26, preferably through a braided or otherwise reinforced plastic hose 41 connected to a main pinch valve 42.

Another main component of the system 10 is a pressurized accelerant holding tank 44 into which is inserted a supply of accelerant for accelerating or hastening the setting time of the gypsum plaster slurry. Although a variety of known accelerants are contemplated, a preferred accelerant in the present system 10 is liquid aluminum sulfate and water. For other accelerants, see copending application U.S. Ser. No. 09/502,609 filed concurrently herewith for Efficient Catalyst for the Set Acceleration of Spray Applied Plaster, which is incorporated by reference herein. Also, depending on the application of the system 10, other adjuvants beside accelerant can be introduced into the slurry flow.

Known slurry spray systems inject accelerant in the interior of the spray gun, which leads to premature setting of at least some slurry particles, and clogging of the gun. Another known system injects accelerant fluid externally into the slurry. However, an undesirable result of this approach is uneven setting of the plaster on the substrate through uneven distribution of the accelerant into the slurry.

In the present system, the accelerant is pressurized in the tank 44, passed through a regulator 46 and is in fluid communication with an accelerant pinch valve 48 located in close operational proximity to the spray gun 40. As will be described in further detail below, the pressurized accelerant is mixed with additional pressurized gas (preferably compressed air) to the point where the accelerant is vaporized. The vaporized accelerant is then introduced to the slurry, preferably at the point where the slurry is emitted from the spray gun 40. Thus, a uniform distribution of accelerant is obtained, and its introduction adjacent the outlet of the spray gun 40 solves both of the problems of prior systems. It is also contemplated that the accelerant may be alternately introduced in pressurized form through a liquid pressure pot or through an open tank with a mechanical pump, both of which are considered to be equivalent to the pressurized holding tank 44.

Figure 2:
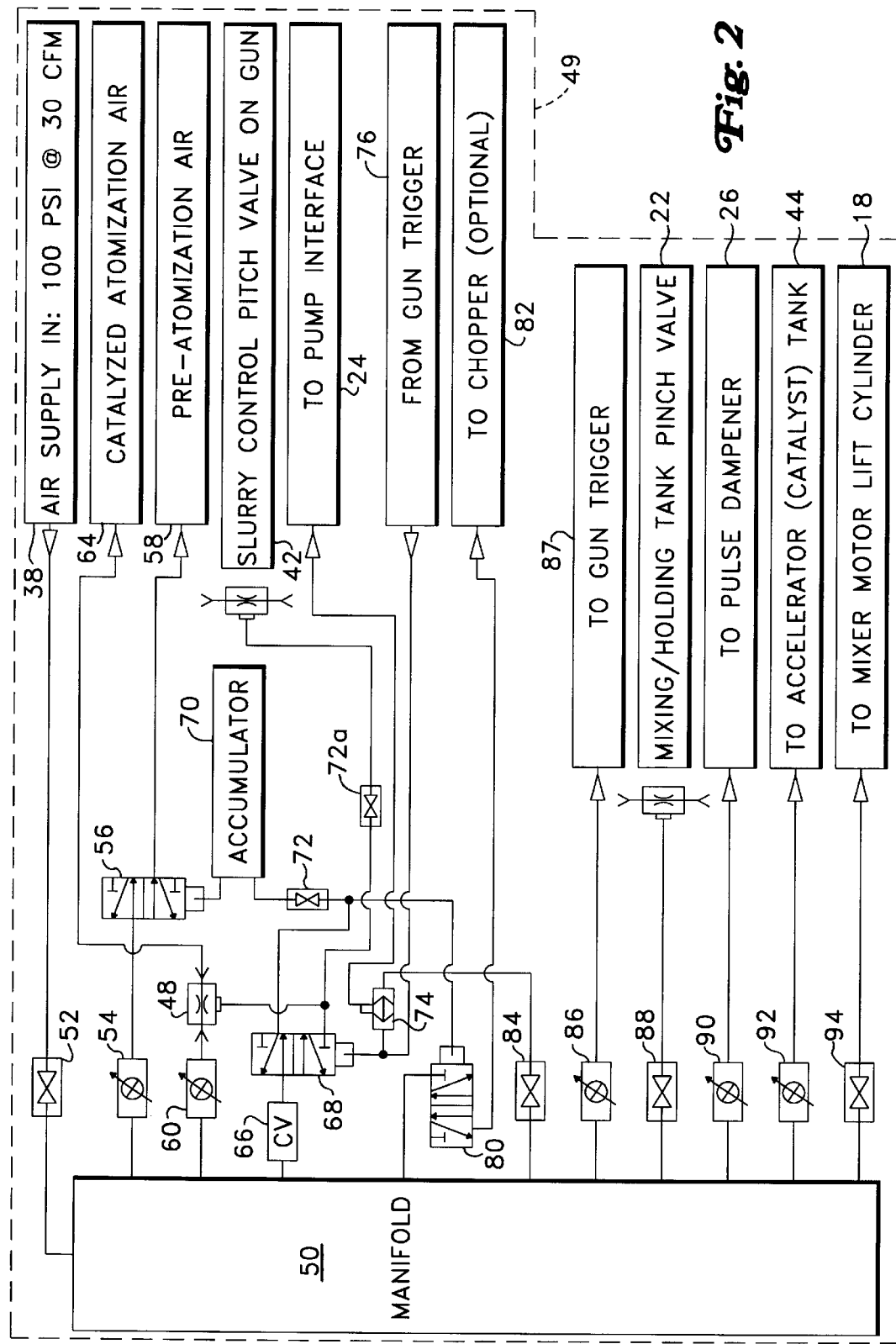
FIG. 2 is a partial schematic of the slurry spray system depicted in FIG. 1.

Referring to FIGS. 1 and 2, for operator safety and simplified maintenance, the present system 10 is pneumatically controlled through a main pneumatic control box 49. Included in the control box 49 is a manifold 50 to which is connected the main supply of compressed air from the compressor 38 through a conventional ball valve 52. Also connected to the manifold 50 is a pressure regulator 54 which is connected, through a pilot valve 56 to a first air supply inlet 58 on the spray gun 40. The inlet 58 is also known as the pre-atomization air inlet.

A second regulator 60 is connected through the pilot controlled pinch valve 48 to an air inlet 64 known as the atomization inlet of the spray gun 40. If the accelerant is provided from a paint-type pressure tank, as the holding tank 44, then the pinch valve 48 is preferably a fine pitched needle valve for regulating the flow of pressurized accelerant fluid. Also connected to the manifold 50 is a check valve 66 which is connected to a pilot valve 68 operating the pinch valve 48, and also connected to an accumulator 70 through a flow control valve 72. The pilot valve 68 is also connected through a flow control valve 72a to a main slurry control pinch valve 42 on the spray gun 40. The accumulator 70 maintains a designated pressure on the pilot valve 56 as is known in the art, and also is connected through the pilot valve 68, to the pump 24 through a shuttle valve 74, and to a FROM port 76 on a trigger valve 78 located on the spray gun 40.

If desired, a third pilot valve 80 may be connected to an optional fiberglass roving chopper 82 for providing a source of ground fiberglass fibers to the slurry. A push button valve 84 is connected to the shuttle valve 74 to allow the operator to manually operate the pump 24 during clean-out or purging cycles. Otherwise, the pump would only be activated when the trigger valve 78 on the spray gun was actuated. Also connected to the manifold 50 is a third pressure regulator 86 which is connected to an IN port 87 on the trigger valve 78. A toggle valve 88 is connected to the tank pinch valve 22, A fourth pressure regulator 90 is connected to the pulse dampener 26, and a fifth regulator 92 is connected to the accelerator holding tank 44 to maintain pressure on the accelerant. Lastly, a toggle valve 94 controls the lift mechanism 18 for the mixer motor 14. In this manner, the manifold 50 controls operational pneumatic flow throughout the system 10.

Referring now to FIG. 3, the spray gun 40 is depicted, and in the preferred embodiment, is based on a prior design produced by ES Manufacturing, Inc. of St. Petersburg, Fla., in which the plaster slurry was merely externally atomized by compressed air. The present spray gun 40 is designed to be used with all slurry viscosities, but most particularly, with very low viscosities, and at high volume outputs, especially when the slurry is cohesive (sticky). Included on the spray gun 40 is a handle 100 having a vertically extending chopper bracket 102 onto which is clamped a main slurry passageway or tube 104 by at least one U-clamp 106. In the preferred embodiment, the U-clamp 106 is fastened to the bracket 102 by threaded fasteners such as hex nuts (not shown), however other types of conventional fastening technologies are contemplated.

The main slurry tube 104 has an inlet or supply end 108 to which is connected, and in fluid communication with, the main slurry pinch valve 42. Opposite the supply end 108 is an outlet end 1 10, to which is secured a nozzle 112. It is contemplated that the outlet end 110 may have many configurations, including straight and in line with the passageway 104, in the preferred embodiment, the outlet end 1 10 gradually and slightly narrows toward the nozzle 112 to facilitate the creation of a uniform spray pattern.

Downstream of the main pinch valve 42 is the air supply inlet 58, which is configured as a halo fitting configured for circumscribing the main passageway 104. In addition, the inlet 58 is in fluid communication with the main passageway 104 via a ring of accurately spaced forwardly angled (toward the outlet end 110), first compressed gas inlet openings 116 for introducing a flow of compressed gas (preferably air from the compressor 38) into the main passageway. This fitting 58 is also known as the preatomizing point, because the compressed air that is introduced here is forced into the main slurry flow to atomize it and make it easier to spray. To seal the air flow into the passageway 104, a pair of O-rings 118 are disposed on either side of the ring of openings 116. As will be seen from FIG. 3, the halo fitting 58 is disposed generally intermediate the supply end 108 and the outlet end 110. The compressed air that is introduced into the halo fitting 58 is controlled by the pneumatic pilot pinch valve 56 (best seen in FIG. 2).

Another feature of the present spray gun 40 is that it introduces two sources of compressed gas (air) into the slurry to properly atomize the slurry for improved spray performance. As described above, the first introduction of compressed gas occurs at the halo fitting 58. A second pressurized gas inlet 120 is disposed closer to the outlet end 110 than is the halo fitting 58 and is placed in relation to the passageway 104 for introducing a second supply of pressurized gas into the slurry. In the preferred embodiment, the second gas inlet 120 is linearly displaced from the halo fitting 58, however other dispositions are contemplated.

Yet another feature of the present system 10 is that the second inlet 120 is also the point at which the accelerant from the accelerant holding tank 44 is introduced in vaporized form, into the slurry. By introducing the accelerant adjacent the nozzle 112, the accelerant does not actually enter the passageway 104, and thus the clogging problem of prior art spray applicators is solved. While the preferred position of the second inlet 120 is adjacent the outlet end 110 and the nozzle 112, it is contemplated that, if the problem of premature slurry setting can be addressed, the second inlet may be positioned along the passageway 104 and closer to the halo fitting 58 so that the blended gas (accelerant and compressed air) is mixed with the combination of the slurry and the pressurized gas between the first inlet and the outlet end.

In shape, the second inlet 120 is preferably integrally cast, molded or formed with the handle 100, and is configured to circumscribe the passageway 104, and provides a second attachment point of the passageway 104 to the spray gun 40. In the preferred embodiment, a threaded fastener 122 is provided for anchoring the outlet end 110 of the passageway 104 to the spray gun 40.

The second pressurized air inlet 120 is placed in fluid communication with a supply of pressurized, so-called external preatomization air from the compressor 38. An inlet 124 in the spray gun 40 is in fluid communication with the air supply from the compressor 38. An air passageway 126 in the handle 100 provides a fluid conduit between the inlet 124 and the second inlet 120. Intermediate the inlet 124 and the second inlet 120 is the accelerant inlet 64 which receives pressurized accelerant from the holding tank 44 and is controlled by the pneumatic pinch valve 48 (best seen in FIG. 2). Thus, prior to reaching the second inlet 120, the compressed air and accelerant from the holding tank 44 is mixed or blended with additional external atomization air from the compressor 38. In this manner, the accelerant is vaporized so that it is more uniformly dispersible in the slurry.

Alternatively, it is also contemplated that the accelerant fluid may be introduced to the slurry spray at the nozzle 112 using a device known in the industry as a "catalyst injection device", a suitable example of which is manufactured by ITW-Binks Manufacturing Co. of Franklin Park, Ill. Such a device includes an accelerator tank holding accelerator fluid, which may be pressurized, like the holding tank 44. Compressed air, which will be used as the external air of atomization to be fed to the halo fitting 58, passes over a venturi, creating a vacuum which draws accelerator fluid from the tank. Flow from the venturi is monitored by a metering device as is known in the art.

The accelerator is vaporized into the stream of compressed air, after which it is carried through a reinforced hose to the spray gun 40 entering at point 124 (FIG. 3). This alternative construction is considered substantially equivalent to the preferred system described above, and is preferred when using viscous accelerants. Yet another alternative is to introduce a relatively viscous accelerant, such as described in commonly assigned, co-pending U.S. patent application Ser. No. 09/502,609 filed concurrently herewith entitled Efficient Catalyst for the Set Acceleration of Spray Applied Plaster and incorporated by reference, through a mechanical pump, such as a piston, diaphragm or other type of metering pump directly to the spray gun 40 at point 64. It is also contemplated that, when slurries of other constituents, such as portland cement or magnesium phosphate products, it could be introduced at the first air supply inlet 58.

Referring now to FIGS. 3 and 4, the second inlet 120 is provided with a plurality of diametrically spaced, inclined air jets 130 which receive the vaporized accelerant and dispense it from the nozzle 112 adjacent a main slurry outlet 132. In the preferred embodiment, the main slurry outlet 132 is located at the outlet end 110 of the passageway 104. The air jets 130 are preferably disposed in spaced, surrounding relationship to the main slurry outlet 132, which is of a relatively larger diameter than the jets 130. In this manner, the vaporized accelerant can be more evenly distributed in the slurry. In the preferred embodiment, the nozzle 112 is configured with a pair of inclined walls 134 so that the air jets 130 impact the slurry flow on an angle. As is the case with the inlet 58, the inlet 120 is provided on either side with an O-ring 136.

The trigger valve 78 is provided on the handle 100 of the spray gun 40 and is placed in fluid communication with the pneumatic control manifold 50 (best seen in FIG. 2). In the preferred embodiment, the trigger valve 78 is a plunger or piston type known in the art, and a suitable model is No. G300-001 produced by E.S. Manufacturing of St. Petersburg, Fla. The trigger valve 78 has a knurled outer boss 138 integrally affixed to a threaded nipple portion 140 which threadably engages a threaded bore (not shown) in the handle 100. An O-ring 142 maintains an air seal at that connection. A main body 144 of the valve 138 defines an axial chamber (not shown) in which reciprocates a poppet 146. An outer end 148 of the poppet 146 serves as the trigger which is actuated by the operator. In combination with the O-ring 142, a relatively smaller O-ring 150 on the main body 144 isolates the outlet 76. Two additional O-rings 154 on the poppet 146 pneumatically isolate the poppet. In a normally closed position, air pressure from the compressor 38 forces a small end 156 of the poppet against the valve body 144 where it is pneumatically sealed by the adjacent small O-ring 154.

To emit slurry, the incoming air 87 from the pressure regulator 86 and the air exiting from the regulator 86 provides the pneumatic pressure to operate the pilot valve 68. Upon depression of the trigger 148, the regulator 86 is placed in fluid communication with the pilot valve 68. Air is fed to the trigger valve 78 through an air inlet 158 located on the handle 100 of the spray gun 40, and is emitted from the outlet port 76 to a gun outlet 160 and into the manifold 50 to initiate flow of slurry.

Referring to FIG. 3, if desired, the system 10 may be equipped with the chopper attachment or chopper gun 82 for introducing chopped fiberglass roving fibers into the slurry stream. The incorporation of such fibers is intended to increase the strength of the set plaster. Such attachments are known in the art, and are pneumatically operated. In the system 10, the chopper attachment 82 is preferably mounted to the chopper bracket 102, and is connected to the pneumatic control box 48 so that it is operated by the pilot valve 80. Once mounted, the chopped fiberglass fibers are combined with the slurry externally of the passageway 104 as is known in the art.

Referring now to Table 1, a list of actual system performance parameters is provided, along with physical slurry data. The plaster mixture entry is a mixture of calcium sulfate hemihydrate, an internal binder which is preferably a free flowing, water redispersable polymer powder such as polyethylene glycol and an adhesive binder, A more detailed disclosure of the plaster mixture is found in copending application U.S. Ser. No. 09/502,740 filed concurrently herewith for Machinable Plaster Composition, which is incorporated by reference herein.

The data indicates that approximately 21–23 pounds of slurry are sprayed per minute at a pump speed of about 40–45%. The pump speed is controlled by a variable speed DC motor (not shown) which in turn is controlled by an AC to DC converter/controller (not shown). Since the converter/controller provides variable DC output to the pump motor in increments measured as a percentage, that is why the speed is indicated as a percentage in Table 1. In Table 1, the dampener 26 is pressurized to 20 psi, the accelerator holding tank 44 is pressurized to about 40–42 psi, the accelerator flow rate is approximately 3 lbs./min, and is proportional to a slurry flow rate of 21 lbs./min. For these examples, the gun nozzle pressure at the inlet 120 was between 68 and 80 psi and the pre-atomization pressure at the first inlet 58 was approximately 100 psi.

In one example, prior to being sprayed the slurry had a consistency of 30 cc, referring to 100 parts by weight of plaster mixture in 30 parts by weight of clean, potable water. In actuality, the slurry mix resulted from a mixture of 150 lbs of sprayable, machinable plaster mixture, 45 lbs of water and a mix time of 10 minutes. In the second example, 250 lbs of plaster mixture, 75 lbs of water and a mix time of 12.5 minutes was employed.

TABLE 1

|  | Trial 1 | Trial 2 |
| --- | --- | --- |
| Pump Speed (%) | 40.00 | 45.00 |
| Slurry Delivery Rate (lbs./min.) | 21.00 | 23.00 |
| Pulse Dampener Pressure (PSI) | 20.00 | 20.00 |
| Accelerator Tank Pressure (PSI) | 40.00 | 42.00 |
| Accelerator Flow Rate (%) | 50.00 | 50.00 |
| Gun Nozzle Aspiration (PSI) | 80.00 | 68.00 |
| Gun Pre-atomization [Burp] (PSI) | 100.00 | 100.00 |
| Slurry Consistency (CC) | 30.00 | 30.00 |
| Plaster mixture 200 (lbs.) | 150.00 | 250.00 |
| Water (lbs.) | 45.00 | 75.00 |
| Mix Time (min.) | 10.00 | 0.52 |

Referring now to Table 2, pump speed vs. slurry output is indicated, and demonstrates that as pump speed is increased, slurry output generally increased, however at higher speeds, the slurry output did not increase as dramatically.

TABLE 2

PUMP SPEED VS. SLURRY OUTPUT

| Pump Speed (%) | Slurry Delivery Rate (lbs./min.) | Pulse Dampener Pressure (PSI) |
| --- | --- | --- |
| 40.00 | 21.00 | 20.00 |
| 60.00 | 30.00 | 20.00 |
| 80.00 | 37.50 | 20.00 |
| 100.00 | 42.00 | 20.00 |

In operation, a supply of slurry is provided to the mixing tank 12 and stirred by the impeller 16. When the operator wants to initiate slurry and accelerator flow, the trigger 148 is depressed axially against the system pressure, placing the air flow to the trigger valve 138 in communication with the outlet 152. The outlet 152 is then in fluid communication with the manifold 50, and will operate the various pinch valves commence the flow of slurry through the pump 24, the dampener 26 and to the spray gun. Simultaneously, compressed air is fed from the compressor 38 to the halo fitting 58, to the accelerator holding tank 44, and to the gun inlet 124 for blending with the accelerant.

Thus, the slurry is first mixed with a preatomizing air at the halo fitting 58 to initially increase flowability. Next, the vaporized accelerant is blended into a second source of compressed air prior to ejection or emission as a blended gas into the slurry. In the preferred embodiment, this blended gas is introduced into the slurry at the nozzle 112. In this manner, the accelerant is more evenly distributed in the slurry, and spray gun clogging is prevented. The present system 10 also features the use of the dampener 26 with the positive displacement peristaltic pump 24 to provide a relatively uniform flow of slurry. The open-topped tank 12 also provides an atmospheric pressure environment for slurry mixing and loading, which further facilitates relatively uniform flow rates. Upon completion of the spraying process, the tank 12 can be filled with water and flushed through the system 10.

While a particular embodiment of the present high performance slurry spray machine has been shown and described, it will be appreciated by those skilled in the art that changes and modifications may be made thereto without departing from the invention in its broader aspects and as set forth in the following claims.

What is claimed is:

1. A slurry spray applicator for spraying a settable slurry, comprising:

a main slurry passageway configured for receiving a supply of pressurized slurry and having a supply end and an outlet end opposite said supply end;

a first compressed gas inlet disposed intermediate said supply and outlet ends and in fluid communication with said slurry passageway for introducing a first supply of pressurized gas into the slurry, said inlet includes a fitting with a plurality of apertures connected to said slurry passageway for introducing said first pressurized gas into said passageway;

a second pressurized gas inlet disposed closer to said outlet end than said first inlet and disposed in relation to said slurry passageway for introducing a second supply of pressurized gas into the slurry;

a pressurized supply of adjuvant in fluid communication with said second pressurized gas inlet for providing a blended gas to said second gas inlet;

valve means for controlling the flow of slurry through said passageway and the flow of said first and second gases into said slurry passageway;

said applicator being constructed and arranged so that prior to the pressurized ejection of the slurry from said outlet end, said first gas is injected into the slurry, and said blended gas is subsequently mixed with the combined slurry and said first pressurized gas.

2. The applicator as defined in claim 1 wherein said second gas inlet is adjacent said outlet end so that said blended gas contacts the slurry upon ejection from said outlet end.

3. The applicator as defined in claim 1 further including a nozzle at said outlet end of said passageway configured for defining a spray pattern of said ejected slurry.

4. The applicator as defined in claim 3 wherein said nozzle includes a main slurry aperture and at least one aperture of relatively smaller diameter surrounding said main slurry aperture configured for dispensing said blended gas and being in fluid communication with said second pressurized gas inlet.

5. The applicator as defined in claim 1 wherein said fitting is a halo fitting.

6. The applicator as defined in claim 1 further including a container for supplying the slurry, and a pump for receiving the slurry from said container and pumping the slurry to said inlet end of said passageway.

7. The applicator as defined in claim 6 further including a mixer in said container for mixing the slurry.

8. The applicator as defined in claim 6 wherein said pump generates a pulsating flow of the slurry, and said machine further includes a slurry dampener in fluid communication with said passageway and being located between said pump and said inlet end for dampening slurry flow surges produced by said pump.

9. The applicator as defined in claim 8 wherein said dampener includes a tubular flexible bladder surrounded by a jacket of compressed air.

10. The applicator as defined in claim 1 wherein said adjuvant is an accelerant for accelerating the setting of the slurry, and said blended gas is introduced into said passageway at a location near said outlet end so that the slurry will not set within said passageway.

11. The applicator as defined in claim 1 wherein said valve means includes a main valve for controlling the flow of the slurry in said passageway, a blended gas control valve for controlling the flow of said blended gas into said passageway and a main gas control valve for controlling the flow of said first gas into said passageway.

12. The applicator as defined in claim 11 wherein at least one of said valves is a pinch valve.

13. The applicator as defined in claim 1 further including control means for controlling said valve means for controlling the ejection of the slurry, said first gas and said blended gas from said outlet end.

14. The applicator as defined in claim 13 wherein said valve means controlled by said control means include a main valve, a main gas control valve, a blended gas control valve and a trigger valve.

15. The applicator as defined in claim 13 wherein said control means and said valve means are pneumatically operated.

16. A machine for spraying settable slurries, comprising:

a container configured for storing a supply of a settable slurry;

a pump in fluid communication with said container for pressurizing the slurry;

an applicator with a main slurry passageway in fluid communication with said container for receiving a supply of the pressurized slurry and having a supply end and an outlet end opposite said supply end;

a first compressed gas inlet disposed intermediate said supply and outlet ends and in fluid communication with said slurry passageway for introducing a first supply of pressurized gas into the slurry, said inlet includes a fitting with a plurality of apertures connected to said slurry passageway for introducing said first pressurized gas into said passageway;

a second pressurized gas inlet disposed closer to said outlet end than said first inlet and disposed in relation to said passageway for introducing a second supply of pressurized gas into the slurry;

a supply of accelerant in fluid communication with said second pressurized gas inlet for providing a blended gas to said second gas inlet;

valve means for controlling the flow of slurry through said passageway and the flow of said first and second gases into said passageway;

control means for controlling said valve means;

said machine being constructed and arranged so that said first gas is injected into the slurry prior to the pressurized ejection of the slurry from said outlet end, and said blended gas is subsequently mixed with the slurry and said first pressurized gas.

17. The machine as defined in claim 16 wherein said container has an open top.

18. The machine as defined in claim 16 wherein said pump generates a pulsating flow of the slurry, and further including dampening means in fluid communication with said pump to dampen said pulsating flow.

19. The machine as defined in claim 18 wherein said dampener includes a tubular flexible bladder surrounded by a jacket of compressed air.

20. The machine as defined in claim 16 wherein said second gas inlet is adjacent said outlet end so that said blended gas contacts the slurry upon ejection from said outlet end.

21. The machine as defined in claim 16 further including a chopper attachment associated with said applicator for chopping a supply of fiberglass roving and injecting said fibers into the slurry.

* * * * *